April 2, 1940.　　　　L. V. MADDOX　　　　2,195,779
CLUTCH
Filed Dec. 16, 1938　　　3 Sheets-Sheet 1

L. V. Maddox
INVENTOR.

BY　*C. A. Snow & Co.*
ATTORNEYS.

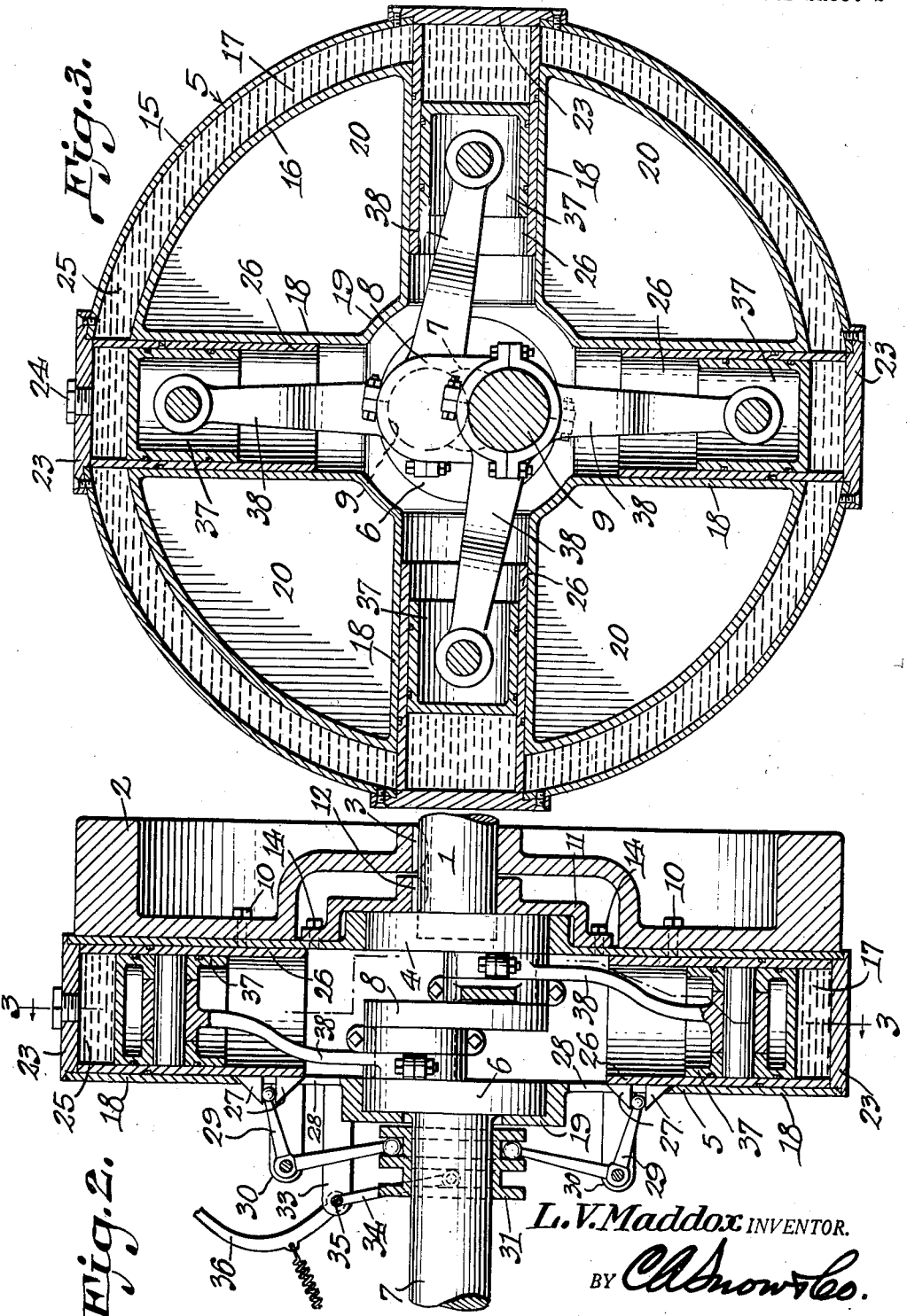

April 2, 1940.　　　　L. V. MADDOX　　　　2,195,779
CLUTCH
Filed Dec. 16, 1938　　　3 Sheets-Sheet 3
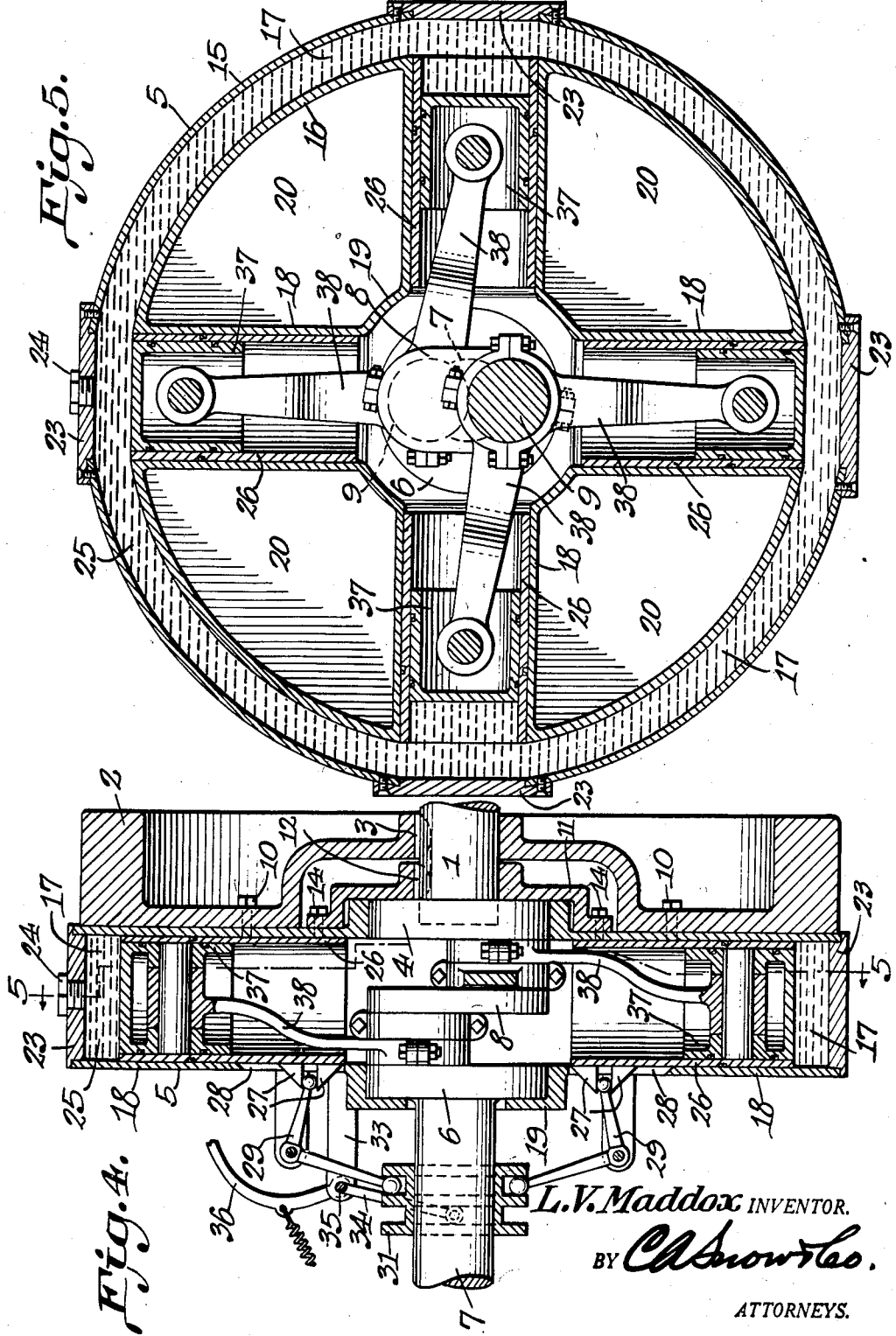
L. V. Maddox INVENTOR.
BY　　　　.
ATTORNEYS.

Patented Apr. 2, 1940

2,195,779

UNITED STATES PATENT OFFICE 2,195,779

CLUTCH

Lofton V. Maddox, Fayetteville, Tenn.

Application December 16, 1938, Serial No. 246,187

1 Claim. (Cl. 192—60)

The device forming the subject matter of this application is a clutch, adapted primarily but not exclusively to be used in connecting the driving and driven parts of a shaft on an automobile. The invention aims to provide a device of the class described in which there will be no dropping of the load, in changing the power ratio, on ascending a hill either going from a lower ratio into a higher ratio or vice-versa. The invention aims to supply a device of the class described which will work smoothly, avoid the gears of a transmission, and, in general, replace by a simple mechanism, more complicated parts in use heretofore.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 2 is a section on the line 2—2 of Fig. 1;

Fig. 3 is a section on the line 3—3 of Fig. 2;

Fig. 4 is a section on the line 2—2 of Fig. 1, but showing the parts shifted from the positions which they occupy in Fig. 2;

Fig. 5 is a section on the line 5—5 of Fig. 4;

Figure 6:
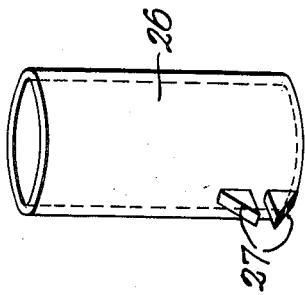
Fig. 6 is a perspective view showing one of the sleeve valves.
Figure 7:
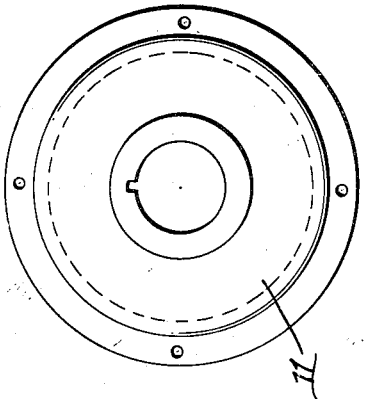
Fig. 7 is an elevation of the cap.
Figure 1:
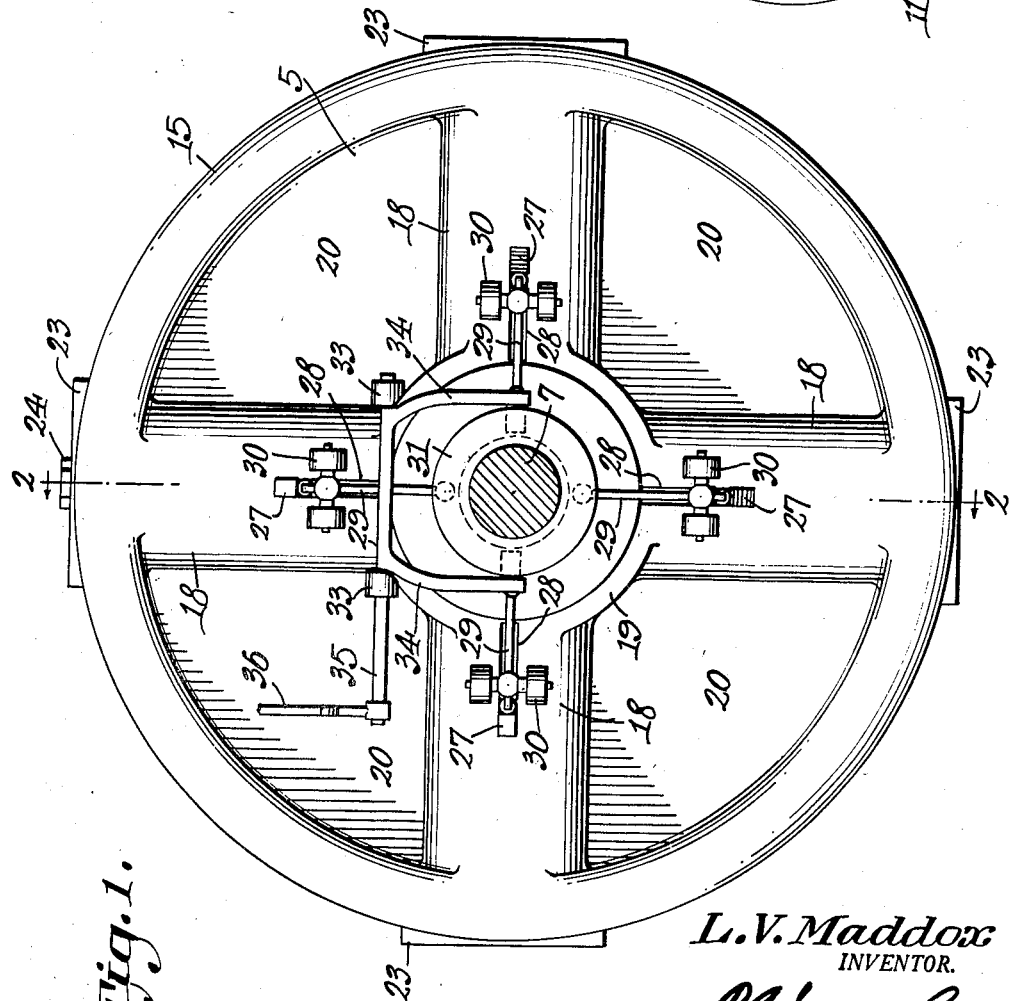
Fig. 1 shows in elevation, a device constructed in accordance with the invention.

The numeral 1 marks a drive shaft, for instance, the shaft of an internal combustion engine. A fly wheel 2 may be secured at 3 to the drive shaft 1 and is journaled in a crank disk 4, received in one side of a casing 5. At 6 there is shown a crank disk received in the opposite side of the casing 5 and carried by a driven shaft 7. An intermediate crank disk 8 is located between the crank disks 4 and 6, and is connected thereto by crank pins 9. The fly wheel 2 is detachably secured at 10 to one side of the casing 5. A cap 11 is housed within the hub of the fly wheel 2 and is connected at 12 to the drive shaft 1. The cap 11 is detachably secured at 14 to one side of the casing 5. The casing 5, sometimes, takes the place of the fly wheel 2, and the construction, obviously, is such that the fly wheel can be employed or omitted, as desired.

The casing 5 includes an outer annular shell 15 and an inner annular shell 16, there being a circumferential passage 17 between the shells. The outer ends of cylinders 18 are connected to the inner shell 16 and the cylinders open into the passage 17. The inner ends of the cylinders 18 are connected to the hub 19 of the casing 5. The cylinders 18 are joined together, and to the inner annular shell 16, and to the hub 19, by webs 20. Access is had to the cylinders 18 by means of cap plates 23, detachably secured to the outer shell 15 of the casing 5, one of the cap plates having a filling plug 24, whereby oil 25 or the like may be introduced into the space 17 between the shells 16 and 15 of the casing.

Sleeve valves 26 are mounted for reciprocation at the will of an operator, in the cylinders 18, the sleeve valves having spaced lugs 27 or the like, which extend outwardly through openings 28 in the cylinders 18. Bell crank levers 29 are fulcrumed on brackets 30, carried by the cylinders 18, the bell crank levers, at one end, being engaged between the lugs 27 of the sleeve valves 26, the opposite ends of the bell crank levers being engaged with a collar 31 on the shaft 7, the shaft 7 being mounted to turn in the collar. The collar 31 is slid longitudinally of the shaft 7 by any suitable means, such as a shaft 35, mounted to turn in brackets 33 on the casing, the shaft being operated by a suitable part 36, under the control of an operator, and located at one end of the shaft 35. The shaft 35 has arms 34, pivotally engaged with the shift collar 31.

Pistons 37 are mounted to reciprocate in the sleeve valves 26 and are pivoted to the outer end of pitmans 38, having their inner ends pivotally mounted on the crank pins 9 which connect the intermediate crank disk 8 with the crank disks 4 and 6.

The operation of the device will be understood readily from what has been stated hereinbefore.

The sleeve valves 26 may be shifted by a train of parts including the bell crank levers 29, the collar 31, and the shaft 35 and parts associated with it. In this way, the sleeve valves 26 may be moved inwardly or outwardly, so as to close, more or less, the passage 17 which exists between the shells 15 and 16 of the casing 5. A circulation of the oil in the passage is impeded to a greater or less extent, the pistons 37 are operated accordingly, and, by means of the pitmans 38, an operative driving connection is effected between the shafts 7 and 1, a gear shift being replaced by a simpler and more perfectly working structure.

The device is smooth in operation, will transmit motion without jar, is simple in construction, and will be found thoroughly advantageous for the ends in view.

Having thus described the invention what is claimed is:

In a power transmitting device, a casing provided with a circumferential passage for the circulation of liquid, the casing including cylinders connected at their outer ends to the inner wall of the passage and communicating throughout their entire cross sectional area with the passage, sleeve valves slidable in the cylinders and adjustable inwardly and outwardly, across the passage, to regulate the transfer of liquid therein, mechanism under the control of an operator for adjusting the sleeve valves inwardly and outwardly, a driven shaft supported for rotation and provided with cranks, pistons mounted to reciprocate in the sleeve valves, pitmans connecting the cranks with the pistons, and a drive shaft whereunto the casing is secured, the casing being rotatable with respect to the driven shaft.

LOFTON V. MADDOX.